(12) United States Patent
Sedoni et al.

(10) Patent No.: US 7,828,683 B2
(45) Date of Patent: Nov. 9, 2010

(54) CVT HYDROMECHANICAL DRIVE

(75) Inventors: Enrico Sedoni, Modena (IT); Claudio Balboni, Modena (IT)

(73) Assignee: CNH America LLC, New Holland, PA (US)

( * ) Notice: Subject to any disclaimer, the term of this patent is extended or adjusted under 35 U.S.C. 154(b) by 644 days.

(21) Appl. No.: 11/799,624

(22) Filed: May 2, 2007

(65) Prior Publication Data

US 2008/0085801 A1    Apr. 10, 2008

(30) Foreign Application Priority Data

May 11, 2006  (IT) .......................... BO2006A0355

(51) Int. Cl.
*F16H 47/04* (2006.01)
(52) U.S. Cl. ....................................... 475/73
(58) Field of Classification Search .................. 475/72, 475/73, 83
See application file for complete search history.

(56) References Cited

U.S. PATENT DOCUMENTS

| | | | |
|---|---|---|---|
| 3,675,507 A | 7/1972 | Takekawa | |
| 6,361,463 B1 | 3/2002 | Kojima | |
| 6,440,026 B1 * | 8/2002 | Johnson et al. | 475/81 |
| 6,616,559 B1 * | 9/2003 | Hori et al. | 475/23 |
| 2004/0209718 A1 * | 10/2004 | Ishibashi et al. | 474/18 |
| 2006/0035542 A1 * | 2/2006 | Ohtsuki | 440/86 |

FOREIGN PATENT DOCUMENTS

JP         10122336         5/1998

* cited by examiner

*Primary Examiner*—Sherry L Estremsky
*Assistant Examiner*—Erin D Bishop
(74) *Attorney, Agent, or Firm*—Patrick M. Sheldrake; Michael G. Harms

(57) ABSTRACT

A CVT hydromechanical drive having: an engine (12) rotating a propeller shaft (11); a hydrostatic unit (13), in turn having a hydraulic pump (14) and a hydraulic motor (15) connected hydraulically to each other; an epicyclic transmission (16); a number of clutches (CH1, CH2, CH3); a differential; and an assembly (PTO). The hydromechanical drive (10) is characterized in that the hydrostatic unit (13) is substantially U-shaped, and in that a longitudinal axis of symmetry (b) of the pump (14) is substantially in line with a longitudinal axis of symmetry (a) of the propeller shaft (11).

7 Claims, 3 Drawing Sheets

CVT HYDROMECHANICAL DRIVE

FIELD OF THE INVENTION

The present invention relates to a CVT hydromechanical drive, in particular for a farm tractor.

BACKGROUND OF THE INVENTION

CVT hydromechanical drives of tractors in the 100-150 HP range pose size problems, the solution to which is becoming increasingly pressing. This type of application normally features either a so-called "in-line" hydrostatic unit, in which the axes of the hydraulic pump and hydraulic motor forming part of the hydrostatic unit form an extension one of the other, or a hydrostatic unit, in which the pump and motor axes are parallel, and the pump and motor are connected by transverse hydraulic lines.

An example of this solution is described in U.S. Pat. No. 6,440,026 (Deere). In the Deere patent, a first gear, fitted to a propeller shaft from an engine, meshes with a gear rotating the pump shaft. The pump in turn provides for hydraulically driving a hydraulic motor (also forming part of the hydrostatic unit) which acts on an epicyclic unit via a gear. The hydrostatic units employed in this type of application are therefore extremely bulky crosswise, mainly on account of the two transmission gears.

A need is therefore felt for solutions which reduce the number of gears connecting the hydrostatic unit to the rest of the drive, and which minimize the transverse size of the hydrostatic unit.

OBJECT OF THE INVENTION

It is an object of the present invention to provide a CVT hydromechanical drive designed to eliminate the aforementioned drawbacks.

SUMMARY OF THE INVENTION

According to the present invention, there is provided a CVT hydromechanical drive as claimed in the accompanying Claims.

BRIEF DESCRIPTION OF THE DRAWINGS

A non-limiting embodiment of the present invention will be described by way of example with reference to the accompanying drawings, in which.

DETAILED DESCRIPTION OF THE PREFERRED EMBODIMENT

Figure 1:
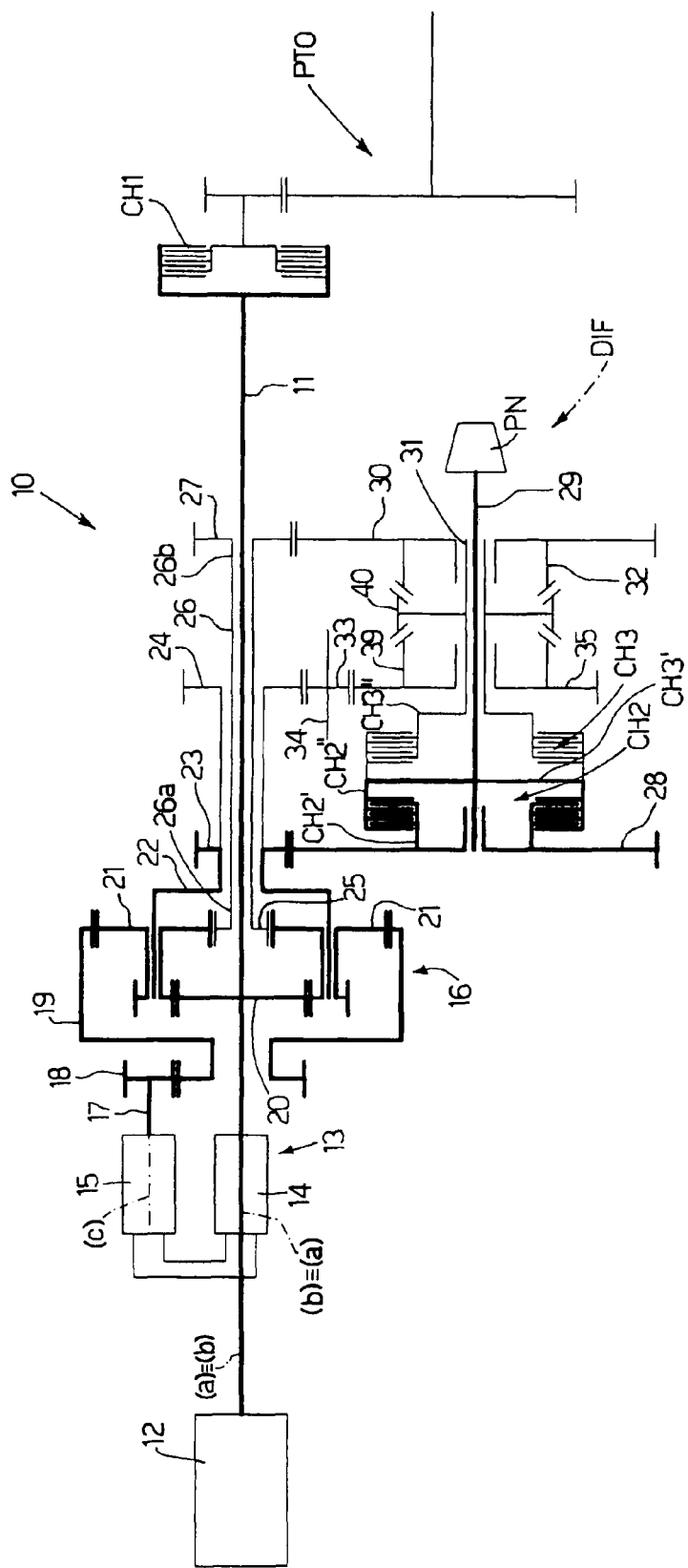
FIG. 1 shows a schematic of a CVT drive in accordance with the present invention in a first configuration (first forward operating mode).
Figure 2:
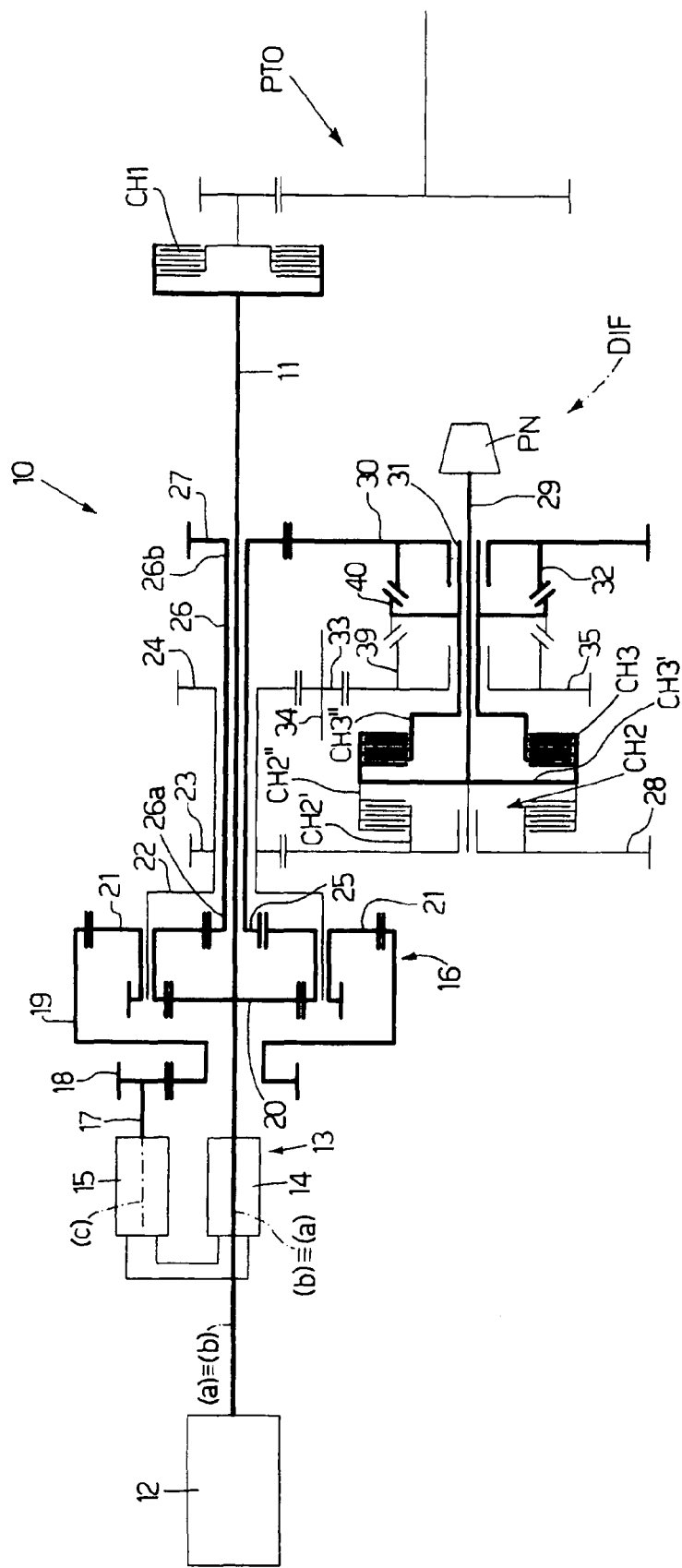
FIG. 2 shows a schematic of the CVT drive according to the present invention in a second configuration (second forward operating mode).
Figure 3:
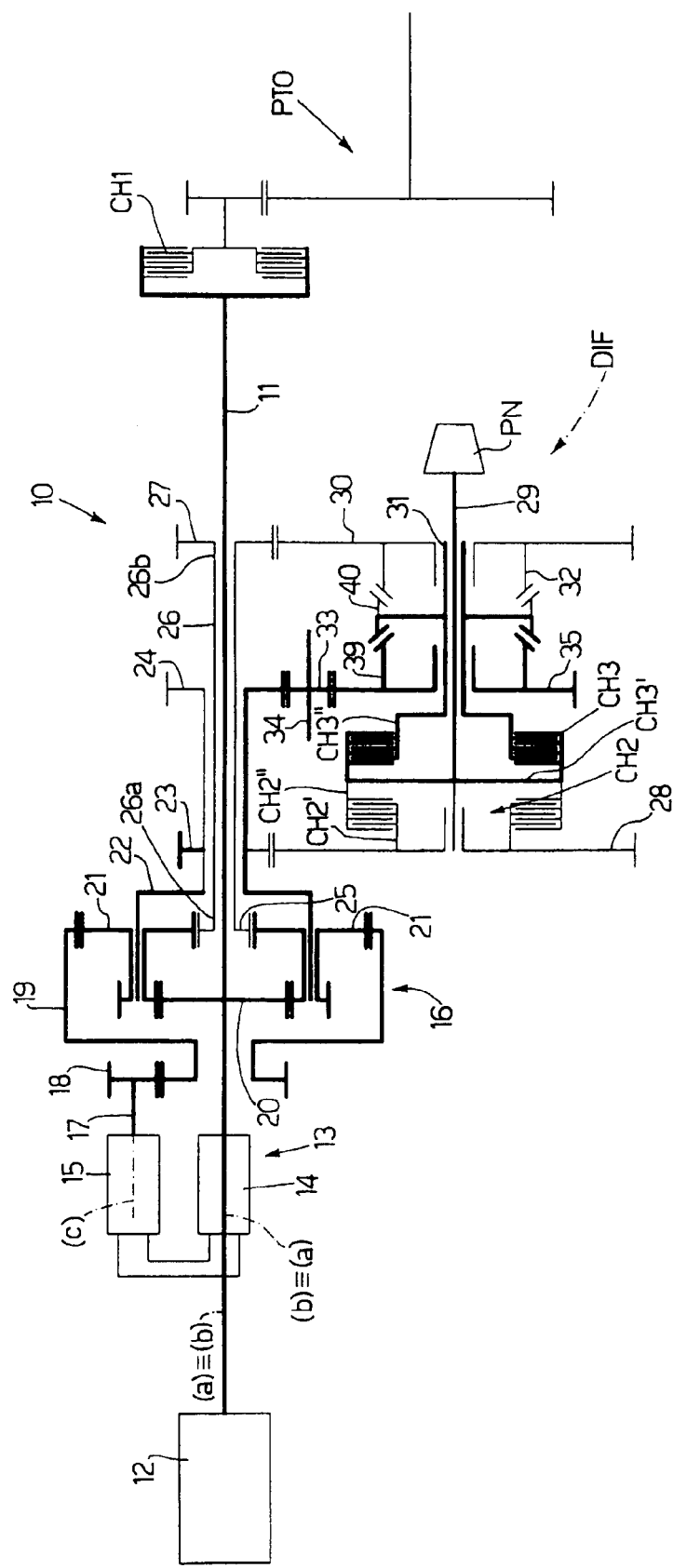
FIG. 3 shows a schematic of the CVT drive according to the present invention in a third configuration (reverse mode).

Number 10 in FIGS. 1, 2, 3 indicates as a whole a CVT hydromechanical drive in accordance with the present invention. It should be pointed out that the description of the component parts of the CVT hydromechanical drive applies to all of the attached FIGS. 1, 2, 3. The three operating modes, on the other hand, are described with specific reference to individual FIGS. 1, 2, 3.

Hydromechanical drive 10 comprises a propeller shaft 11 rotated by an engine 12. Hydromechanical drive 10 comprises a hydrostatic unit 13, in turn comprising a variable-delivery pump 14 and a variable-delivery hydraulic motor 15 connected hydraulically to each other in known manner not shown in FIG. 1.

As shown in the attached drawings, pump 14 is driven directly by propeller shaft 11. Motor 15, driven by hydraulic pump 14, in turn drives a number of parts of an epicyclic transmission 16 (see below). More specifically, hydraulic motor 15 has a drive shaft 17 fitted with a gear 18, which meshes with a ring gear 19 of epicyclic transmission 16. In addition to ring gear 19, epicyclic transmission 16 also comprises, in known manner, a first sun gear 20 fitted to propeller shaft 11. Among other things, propeller shaft 11 terminates with a first clutch CH1 mechanically connecting (when so selected by the operator) hydromechanical drive 10 to a PTO.

A number of planet gears 21 (only two shown in FIG. 1) are interposed between first sun gear 20 and ring gear 19, and are supported by one planet-carrier 22 fitted with two gears 23 and 24. In addition to first sun gear 20 and ring gear 19, planet gears 21 also mesh with a second sun gear 25 integral with a first end 26a of a hollow shaft 26, through which propeller shaft 11 extends to the PTO. At a second end 26b, hollow shaft 26 is fitted with a gear 27.

As shown in the attached drawings, gear 23, fitted to planet-carrier 22, meshes with an idler gear 28 on a shaft 29 fitted integrally with a pinion PN for transmitting motion to the differential DIF (not shown) of the wheels. A second clutch CH2 connects gear 28 mechanically to shaft 29. More specifically, a first portion CH2' of clutch CH2 is integral with gear 28, and a second portion CH2" of clutch CH2 is integral with shaft 29. Second clutch CH2 is activated (engaged) automatically by an electronic central control unit (not shown) when the operator wishes to make gear 28 integral with shaft 29 (see below). In addition, gear 27 meshes with a gear 30 fitted idly to a shaft 31 connected mechanically to a third clutch CH3. More specifically, a first portion CH3' of clutch CH3 is integral with shaft 29, and a second portion CH3" of clutch CH3 is integral with shaft 31.

Shaft 31 is hollow, so as to house shaft 29; and shafts 29 and 31 are coaxial. A bevel gear 32 is fitted to gear 30. On the other hand, gear 24, also fitted to planet-carrier 22, meshes with an idler gear 33, of axis 34, which in turn meshes with an idler gear 35 on shaft 31. A bevel gear 39 is also fitted to gear 35, in the same way as gear 30. Bevel gear 32 is oppositely conical with respect to bevel gear 39. Between bevel gears 32 and 39, a synchronizing device 40 is fitted to shaft 31 to selectively connect gear 30 or gear 35 integrally to shaft 31, as described below.

CVT hydromechanical drive 10 according to the present invention operates as follows. For the sake of clarity, it should be pointed out that the commands by which CVT hydromechanical drive 10 assumes one of the three configurations shown in FIGS. 1, 2, 3 are imparted by the operator using a lever-operated manual control (not shown) and via the electronic central control unit.

As stated, FIG. 1 shows a schematic of CVT hydromechanical drive 10 in a first configuration (first forward, low-speed operating mode). The mechanical and hydraulic parts involved in transmitting motion from engine 12 to pinion PN in this configuration are highlighted in bold print. As stated, in the FIG. 1 configuration, the vehicle is moving at low speed. In fact, the second clutch is activated (engaged), while the third clutch CH3 is idle (released). Motion is therefore transmitted from first sun gear 20 of epicyclic transmission 16 to planet-carrier 22, gear 23, gear 28, and therefore to shaft 29 and pinion PN via the activated (engaged) second clutch CH2 (FIG. 1).

To alter the output speed at pinion PN (while still remaining in low-speed mode), the operator can use hydrostatic unit 13 (more specifically, hydraulic motor 15), which acts in known manner on ring gear 19 of epicyclic transmission 16 to accelerate or decelerate planet-carrier 22. Since gear 28 is much larger in diameter than gear 23, high torque and low speed will be produced on pinion PN.

To switch to high-speed operating mode at this point, the electronic central control unit, in response to a request by the operator, deactivates (releases) second clutch CH2, and activates (engages) third clutch CH3 (FIG. 2); at the same time, synchronizing device 40 meshes with bevel gear 32 to make gear 30 integral with shaft 31. Motion is therefore transmitted from first sun gear 20 of epicyclic transmission 16 to second sun gear 25 (via planet gears 21), to shaft 26, gear 27, gear 30, shaft 31, clutch CH3 (engaged), shaft 29 and therefore pinion PN (FIG. 2).

Since, in the FIG. 2 configuration, rotation of gear 30 is induced by second sun gear 25 smaller in diameter than first sun gear 20, gear 27 generally rotates faster than gear 23, so that the rotation speed of pinion PN increases.

As stated with reference to FIG. 1, to alter the output speed at pinion PN (while still remaining in high-speed mode), the operator can use hydrostatic unit 13, which acts in known manner on ring gear 19 of epicyclic transmission 16 to accelerate or decelerate planet gears 21 and therefore second sun gear 25.

FIG. 3 shows a schematic of CVT drive 10 in a third configuration, i.e. reverse mode. In this case, clutch CH3 is again activated (as in the FIG. 2 configuration), but synchronizing device 40 meshes with bevel gear 39 to make gear 35 integral with shaft 31. Consequently, even though gear 24 still rotates in the same direction, idler gear 33 inverts the rotation direction of gear 35 and, therefore, of pinion PN, thus reversing the vehicle. Fine reverse speed adjustment is made in the usual way by activating hydrostatic unit 13, which acts on the epicyclic transmission as described above.

As shown in FIGS. 1, 2, 3, propeller shaft 11 is connected mechanically to first clutch CH1, which is selectively activated (engaged)/deactivated (released) by the operator to activate or not the PTO. The main advantage of CVT drive 10 according to the present invention lies in its extreme compactness crosswise, which is due to employing a substantially U-shaped hydrostatic unit, and to the fact that the longitudinal axis of symmetry (b) of the pump is substantially in line with the longitudinal axis of symmetry (a) of the propeller shaft.

What is claimed is:

1. A CVT hydromechanical drive comprising:
    an engine rotating a propeller shaft;
    a hydrostatic unit, in turn comprising a hydraulic pump and a hydraulic motor connected hydraulically to each other;
    an epicyclic transmission;
    a plurality of clutches; and
    an assembly;
    a first gear fitted to a planet carrier of the epicyclical transmission meshes with an idler gear on a pinion shaft having a pinion configured for transmitting motion to a differential and a first clutch connects the idler gear to the pinion shaft, wherein a first portion of the first clutch is integral with the idler gear, and a second portion of the first clutch is integral with the pinion shaft; and
    said hydrostatic unit is substantially U-shaped, and in that a longitudinal axis of symmetry of said pump is substantially in line with a longitudinal axis of symmetry of said propeller shaft, wherein the hydraulic motor is configured to directly drive a ring gear of the epicyclical transmission and accelerate or decelerate the planet carrier of the epicyclical transmission.

2. A hydromechanical drive as claimed in claim 1, wherein a first sun gear of said epicyclic transmission is fitted directly on said propeller shaft.

3. A hydromechanical drive as claimed in claim 2, wherein the hydraulic motor drives the ring gear of said epicyclic transmission directly through a second gear connected to a shaft of the motor.

4. A hydromechanical drive as claimed in claim 2, wherein said propeller shaft drives said assembly directly via a second clutch.

5. A hydromechanical drive as claimed in claim 1, wherein said hydraulic motor, forming part of said substantially U-shaped hydrostatic unit, drives the ring gear of said epicyclic transmission directly through a second gear connected to a shaft of the motor.

6. A hydromechanical drive as claimed in claim 1, wherein said propeller shaft drives said assembly directly via a second clutch.

7. A hydromechanical drive as claimed in claim 1, wherein a third gear located along the propeller shaft meshes with a fourth gear fitted idly to an additional shaft connected to a third clutch, wherein a first portion of the third clutch is connected with the pinion shaft and a second portion of the third clutch is integral with the additional shaft.

* * * * *